June 13, 1961        G. E. PIHL        2,988,696
ULTRA LOW FREQUENCY PHASE METER
Filed March 10, 1960        3 Sheets-Sheet 1

*INVENTOR.*
GEORGE E. PIHL
BY
Porter, Chittick & Russell
ATTORNEYS

June 13, 1961 G. E. PIHL 2,988,696
ULTRA LOW FREQUENCY PHASE METER
Filed March 10, 1960 3 Sheets-Sheet 3
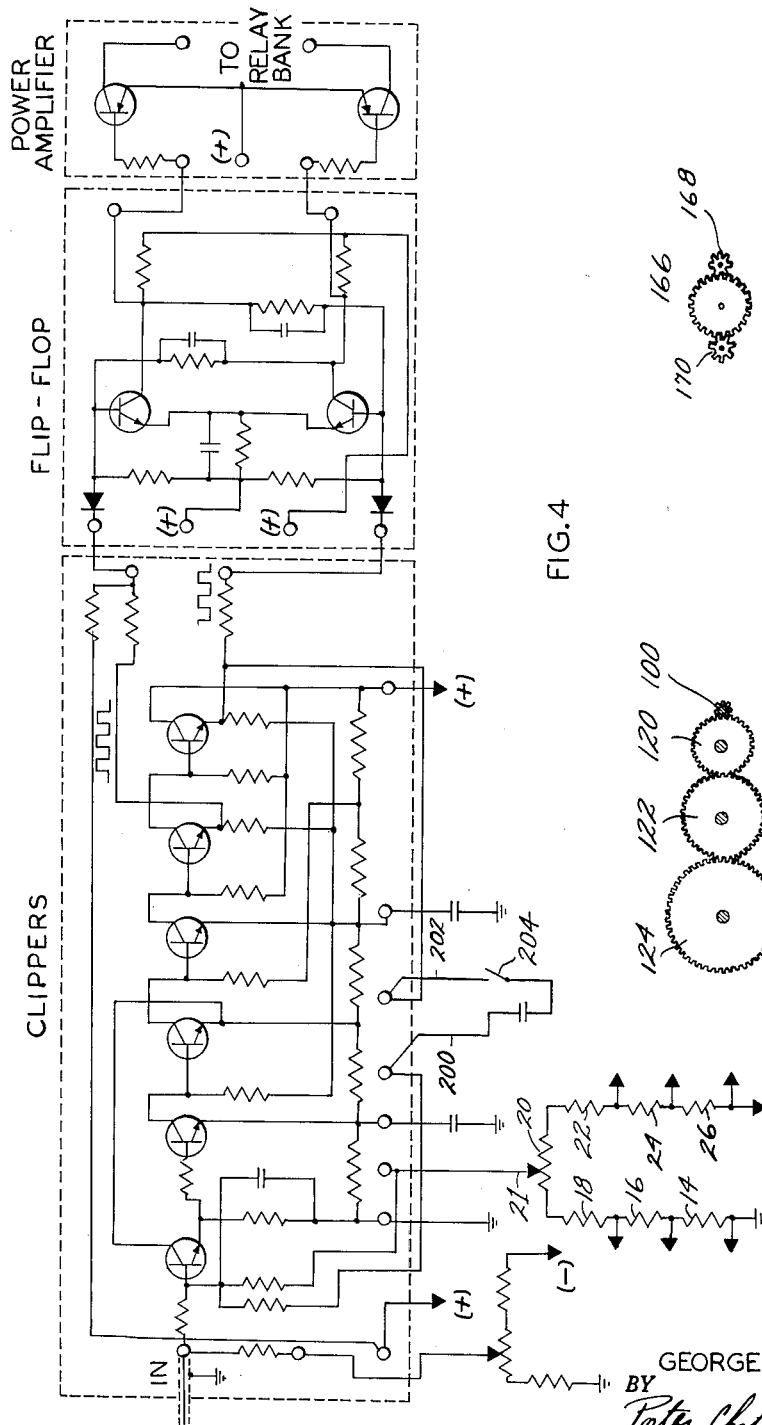
FIG. 4
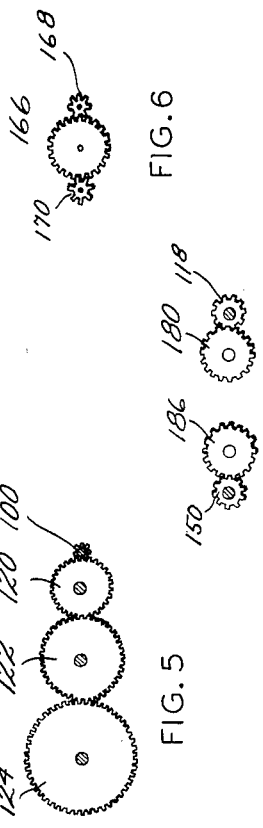
FIG. 6
FIG. 7
FIG. 5
*INVENTOR.*
GEORGE E. PIHL
BY
*Porter, Chittick & Russell*
ATTORNEYS

United States Patent Office 2,988,696
Patented June 13, 1961

2,988,696
ULTRA LOW FREQUENCY PHASE METER
George E. Pihl, Abington, Mass., assignor to Technology Instrument Corporation of Acton, a corporation of Massachusetts
Filed Mar. 10, 1960, Ser. No. 14,067
6 Claims. (Cl. 324—83)

This invention relates to phase meters and more particularly to an instrument for measuring the phase angle between two ultra low frequency signals.

The primary object of this invention is to provide an instrument capable of making precise and accurate phase angle measurements of signals in a relatively wide frequency band below one cycle per second.

A further object of this invention is to provide an ultra low frequency phase meter which will not provide a faulty reading due to stray background or noise.

A more specific object of this invention is to provide an instrument for determining the phase angle between a reference signal and a test signal, the instrument comprising a potentiometer having first and second wipers, normally off first drive means for moving said first wiper along said potentiometer at a fixed speed, normally off second drive means for moving said second wiper along said potentiometer at the same fixed speed, means for starting the first drive means as the reference signal crosses the zero axis in a given direction, means for stopping the first drive means on the first corresponding zero axis crossing of the test signal occurring after the starting of the first drive means, means for starting the second drive means simultaneously with the stopping of the first drive means, means for stopping the second drive means after the next zero axis crossing in the same direction of the reference signal, means for connecting the potentiometer to a predetermined fixed voltage, and means for obtaining an output voltage from the potentiometer proportional to the resistance between the two sliders after the second drive means has stopped. It is contemplated that the potentiometer may comprise a single unit having a single resistance element and two separate and individually driven wipers, or two separate units each comprising a resistance element and a wiper with the two resistance elements connected in series. The latter approach is preferred and is used in the preferred embodiment of the invention described and illustrated herein.

Other objects and many of the attendant advantages of the invention will be readily appreciated as reference is had to the following detailed description when considered in connection with the accompanying drawings wherein:

FIG. 4 is a circuit diagram of one of the signal channels;

FIG. 5 is a sectional view taken along line 5—5 of FIG. 2;

FIG. 6 is a sectional view taken along line 6—6 of FIG. 2; and

FIG. 7 is a sectional view taken along line 7—7 of FIG. 2.

Figure 1:
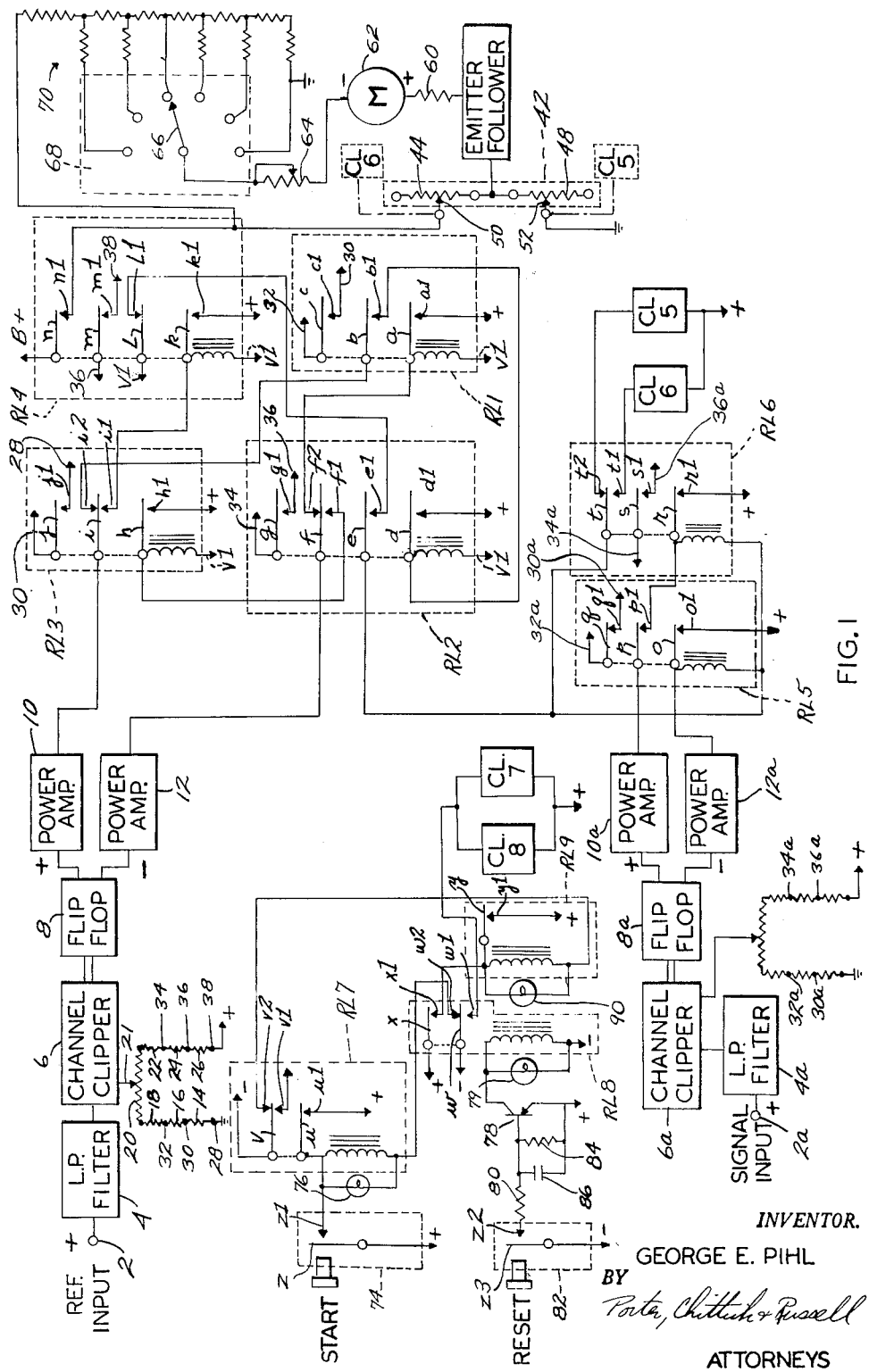
FIG. 1 is a circuit diagram of the preferred form of the invention.

Referring now to FIG. 1, the electrical system includes two identical signal channels, one for the "reference" signal and the other for the "test" signal. The reference channel comprises input terminal 2 coupled to a low pass filter 4 which in turn is coupled to a multistage clipper amplifier 6. The latter is coupled in turn to a flip-flop 8 that is connected on one side to a power amplifier 10 and on the other side to a power amplifier 12. Power amplifiers 10 and 12 are substantially identical.

Like numbers followed by the letter "a" are employed herein to identify sections of the test signal channel corresponding to the foregoing sections 2–12 of the reference channel.

The two channels operate in the same manner: an ultra low frequency signal (1 c.p.s. or lower) introduced at input terminal 2 is first stripped of undesired higher frequency components by the low pass filter 4 and then clipped by the clipper 6. The latter produces two output signals, one of which is in phase and the other of which is 180 degrees out of phase with the input signal. Both output signals have zero axis crossings coincident with those of the input signal. These two out-of-phase outputs of the clipper are used to trigger flip-flop 8, one clipper output triggering the flip-flop to one stable condition and the other clipper output triggering the flip-flop to the opposite stable conditions. The flip-flop improves the wave form of the clipper outputs by decreasing the rise and fall times. Two outputs 180 degrees out of phase are produced by flip-flop 8. One flip-flop output is applied to amplifier 10 and the other to amplifier 12. Single outputs are obtained from the two amplifiers, with one output in phase and the other 180 degrees out of phase with the signal applied to input terminal 2.

For convenience, FIG. 1 indicates by plus and minus signs the phase relationships of the outputs of the flip-flop to the input signal when the input signal is positive. The polarities of the flip-flop outputs are reversed when the input signal is negative.

A variable biasing circuit is provided for varying the operating level of clipper 6 which is transistorized and includes several stages. It comprises seven resistors 14, 16, 18, 20, 22, 24, and 26 connected in the order named between ground and a positive voltage source. Resistor 20 is part of a potentiometer whose slider 21 is connected to the base of the transistor of the first stage of the clipper. Changing the operating bias of the first stage of the clipper is accomplished by shorting out selected ones of these seven resistors. Shorting out is accomplished by connections to selected ones of six terminals 28, 30, 32, 34, 36, and 38 of the resistor network. Clipper 6a has a biasing network which is identical except that only four terminals 30a, 32a, 34a, and 36a are used. The shorting-out procedure is described in more detail hereafter.

The phase angle between the reference and test signals is measured by means of a potentiometer 42 comprising two resistors 44 and 48 connected in series and two independently operable sliders 50 and 52 respectively. The manner in which the phase angle is measured by potentiometer 42 is determined by a unique electromechanical system now to be described.

This electromechanical system comprises a plurality of relays, including six switching relays RL1, RL2, RL3, RL4, RL5, and RL6, a starting relay RL7, a reset relay RL8, and holding relay RL9 for a ready signal circuit. All relays are shown in their normal deenergized positions; and for convenience, each movable contact is identified by a letter and each fixed contact is identified by the same letter as the movable contact that closes on it.

Relay RL1 has three movable contacts $a$, $b$, and $c$ which are normally open to contacts $a1$, $b1$, and $c1$. Contact $a$ is permanently connected to the upper end of the relay coil. The lower end of this relay coil and the corresponding ends of the coils of relays RL2, RL3, and RL4 are all connected permanently to fixed contact $v1$ of relay RL7. Contact $a1$ is permanently connected to a plus voltage source. Contacts $b$ and $c$ are normally open to contacts $b1$ and $c1$ respectively. Contact $c$ is connected to terminal 32, and contact $c1$ is connected to terminal 30 of the biasing network for clipper 6.

Referring now to relay RL2, the upper end of its coil is connected to contact $b1$ and also to its own contact $d$. Contact $d$ is normally open to contact $d1$ which is connected to a positive voltage source. Contact $e$ is normally open to contact $e1$. Contact $f$ is normally open to contact $f1$ and closed to contact $f2$. The latter is permanently connected to contact $a$, while contact $f$ is connected to the output side of amplifier 12. Contact $g$ is permanently connected to terminal 34 of the biasing network of clipper 6 and is normally open to contact $g1$ which is permanently coupled to terminal 36 of the same network.

Referring now to relay RL3, the upper end of its coil is permanently connected to contact $f1$ and to its own movable contact $h$. The latter is normally open to contact $h1$ which is connected to a positive voltage source. Contact $i$ is connected permanently to the output terminal of amplifier 10; it is normally open to contact $i1$ and closed to contact $i2$. The latter is permanently connected to contact $b$ of relay RL1. Contact $j$ is normally open to conttact $j1$. Contacts $j$ and $j1$ are permanently connected to terminals 30 and 28 of the biasing network of clipper 6.

Referring now to relay RL4, the upper end of its coil is connected permanently to contact $i1$ and also to its own movable contact $k$. The latter is normally open to fixed contact $k1$ which is connected to a positive voltage source. Contact $L$ is normally closed to contact $L1$ which is permanently connected back to contact $e1$ of relay RL2. Contact $L$ is permanently connected to contact $V1$ of relay RL7. Contact $m$ is permanently connected to terminal 36 and is normally open to contact $m1$ which is permanently connected to terminal 38. Contact $n$ is permanently connected to a constant voltage source B+ and is normally open to contact $n1$ which has a permanent electrical connection to slider 50 of potentiometer 42. Slider 52 of potentiometer 42 has an electrical connection to ground.

The junction of resistors 44 and 48 is connected to the input side of an emitter follower 58 whose output is coupled by a resistor 60 to the positive terminal of a meter 62. The negative terminal of meter 62 is connected by means of a variable calibrating resistor 64 to the movable contact 66 of a phase angle range switch 68. The latter has six stationary contacts connected through individual dropping resistors to different points on a voltage divider resistance network 70. One end of network 70 is connected to relay contact $n1$ and the other end is connected to ground. The six switch positions provide six 60-degree measuring ranges, the contact in the six o'clock position (connected to ground) being used for phase angles from 0 to 60 degrees, and the contact in twelve o'clock position being used for measurements of phase angles in the range of 300 to 360 degrees. Switch 68 is hand operated.

Referring now to relay RL5, the bottom end of its coil is connected in parallel with the bottom end of the coil of RL6 to movable contact $e$ of RL2. The top end of its coil is connected permanently to the output terminal of amplifier 12a and to movable contact $o$. Contact $o$ is normally open to contact $o1$ which is connected to a positive voltage source. Movable contact $p$ is permanently connected to the output terminal of amplifier 10a and is normally open to contact $p1$. Contact $q$ is permanently connected to terminal 32a and is normally open to contact $q1$ which is permanently connected to terminal 30a.

Referring now to relay RL6, the upper end of its coil is connected to contact $p1$ and also to movable contact $r$ which is normally open to contact $r1$ which is connected to a positive voltage source. Contact $s$ is permanently connected to terminal 34a and is normally open to contact $s1$ which is permanently connected to terminal 36a. Contact $t$ is permanently connected to contact $e$ of relay RL2. Contact $t$ is normally open to contact $t1$ and closed to contact $t2$. Contact $t1$ is permanently connected to one side of the operating coil of a magnetic clutch CL6 and contact $t2$ is permanently connected to the corresponding side of the operating coil of a magnetic clutch CL5. The other sides of the operating coils of clutches CL5 and CL6 are permanently connected to a positive voltage source. As explained more fully hereinafter and as illustrated schematically in phantom in FIG. 1, clutch CL5 causes operation of slider 52 and clutch CL6 causes operation of slider 50.

Referring now to starting relay RL7, the top end of its coil is connected to movable contact $u$ and also to a fixed contact $z1$ of a push-button start switch 74. The movable contact $z$ of this switch is permanently connected to a positive voltage source. Contact $z$ is normally open to contact $z1$. An amber-colored bulb 76 is connected across the coil of relay RL7. Contact $u$ is normally open to contact $u1$ which is permanently connected to a positive voltage source. Movable contact $v$ is permanently connected to a negative voltage source and is normally open to contact $v1$ and closed to contact $v2$. Contact $V1$ is connected to the bottom ends of the coils of relays RL1, RL2, RL3, and RL4.

Referring now to reset relay RL8, the lower end of its coil is connected to a negative voltage source and the upper end is connected to the collector of a transistor 78. A red bulb 79 is connected across the coil. The emitter of transistor 78 is connected to a positive voltage source and its base is connected by a resistor 80 to the fixed contact $z2$ of a reset switch 82. The movable contact $z3$ of this switch is contact to a negative voltage source. Connected in parallel between the emitter and base of transistors 78 are resistor 84 and capacitor 86. Resistors 80 and 84, capacitor 86, and transistor 78 form a time delay circuit which keeps the coil of relay RL8 energized for a short period after reset switch 82 has reopened. In practice, the values of resistors 80 and 84 and capacitor 86 are selected to give about a 3-second delay.

Movable contact $w$ of relay RL8 is connected to a negative power supply, and movable contact X is permanently connected to a positive power supply. Contact W is normally open to contact W1 and closed to contact W2. Contact W2 is connected to the bottom end of the coil of relay RL7. Contact W1 is permanently connected to the negative sides of the coils of two magnetic clutches CL7 and CL8. The other sides of the same coils are connected to a positive voltage source.

Refering now to relay RL9, the bottom end of its operating coil is connected to contact $v2$ of starting relay RL7 and the top end is connected to contact X1 of reset relay RL8 and to movable contact $y$. A green bulb 90 is connected across the coil. Its movable contact $y$ is normally open to contact $y1$ which is connected to a positive voltage source.

As stated previously, clutches CL5 and CL6 control movement of wipers 52 and 50 respectively. How this is accomplished is illustrated schematically in FIG. 2. This figure illustrates a complete forward and reverse drive system for the two wipers. In this connection, it is to be noted that the starting position of wiper 50 is at the bottom end of resistance 44 and the starting position of wiper 52 is at the top end of resistance 48. Hence, in this context, "forward" movement of the sliders is away from the junction of the two resistors and "reverse" movement is back toward that junction.

The electromechanical drive system for wipers 50 and 52 comprises two motors M1 and M2. Motor M1 drives the wipers forward and motor M2 drives the wipers in reverse. The output shaft of motor M1 carries a gear 100 and is coupled by a magnetic clutch CL1 to a shaft 104 carrying a gear 106. Gear 106 meshes with an equalsized gear 108 mounted on a shaft 110 which is coupled by a slip clutch 112 and magnetic clutch CL5 to the operating shaft 114 of a first 10-turn potentiometer 116. This potentiometer comprises the resistance 48 and the slider 52. A gear 118 is mounted on the operating shaft 114.

Gear 100 meshes with a gear 120 which in turn meshes with a gear 122 that meshes with a gear 124. Gears 100, 120, 122, and 124 form a stepped gear system with each step providing a 10:1 gear ratio. These gears act through magnetic clutches CL2, CL3, and CL4 to drive gears 134, 136, and 138 respectively which are identical to gears 106 and 108. Gear 134 meshes with gears 106 and 136, and gear 138 meshes with gear 136 and also with an identical gear 140 mounted on a shaft 142. Shaft 142 is coupled through a slip clutch 144 and a magnetic clutch CL6 to the operating shaft 146 of a second 10-turn potentiometer 148. This potentiometer comprises resistance 44 and slider 50. A gear 150 identical in size to gear 118 is mounted on operating shaft 146.

The energizing coils of magnetic clutches CL1, CL2, CL3, and CL4 are connected on one side to a common positive power supply and on the other side to terminals 154, 156, 158, and 160 respectively of a rotary switch 152. The rotary contact 162 of this switch is coupled to a negative power supply.

The output shaft of motor M2 carries a gear 166 which meshes with two identical gears 168 and 170 mounted on shafts 172 and 174 respectively. Shaft 172 is coupled by a slip clutch 176 and magnetic clutch CL7 to a shaft 178 which carries a gear 180 that meshes with gear 118. Shaft 174 is coupled by a slip clutch 182 and magnetic clutch CL8 to a shaft 184 which carries a gear 186. Gear 186 is the same size as gear 180 but meshes with gear 150.

The foregoing system provides four different forward speeds for sliders 50 and 52, the speeds differing progressively by a factor of 10. The highest speed occurs when switch 152 is closed to terminal 154. In this position, magnetic clutch CL1 is engaged and shaft 110 is driven through gears 100, 106, and 108. Shaft 142 is driven at the same speed through gears 100, 106, 134, 136, 138, and 140. The lowest speed occurs when the switch is closed to terminal 160. Then shaft 110 is driven through stepped gears 100–124 and identical gears 138, 136, 134, 106, and 108. At the same time, shaft 142 is driven through stepped gears 100–124 and gears 138 and 140. Although shafts 110 and 142 always operate at the same time, the same is not true of shafts 114 and 146 since they are controlled separately by clutches CL5 and CL6. These clutches are engaged alternately as described hereinafter.

The gear and clutch system connecting motor M2 and shafts 114 and 146 provides a single high speed of operation in a direction opposite to the direction of rotation that results when shafts 114 and 146 are coupled to motor M1. Preferably, motors M1 and M2 are connected so that they will begin to operate as soon as power is supplied to the system. Alternatively, they may be connected to start switch 74 by means of a separate contact circuit so as to operate only when switch 74 is closed.

Figure 3:
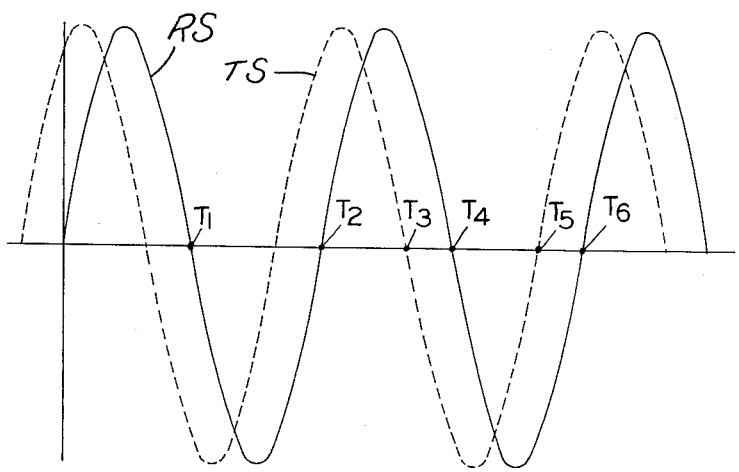
FIG. 3 is a waveform diagram of a reference signal and a test signal and identifies selected zero axis crossings which are significant to the present invention.

Operation of the apparatus will now be described in connection with measurement of the phase angle between a periodic reference signal RS and a periodic test signal TS (FIG. 3). Assume that motors M1 and M2 are both operating, switch 152 is closed to a selected one of its terminals, sliders 50 and 52 are in their normal positions nearest the common junction of resistors 44 and 48, and relays RL1–RL9 are in their normal positions (FIG. 1). The two signals RS and TS are coupled to input terminals 2 and 2a respectively, and the button of start switch 74 is then pushed in momentarily. Relay RL7 will shift contacts $u$ and $v$. Closing contacts $u$ and $u1$ establishes a holding circuit for relay RL7 through contacts $w$ and $w1$. Closing contacts $v$ and $v1$ connects a negative voltage to the bottom ends of the coils of relays RL1, RL2, RL3, and RL4. However, none of these coils will be energized until a negative going zero crossing of reference signal RS occurs. When the reference signal next goes negative (time $=T_1$ in FIG. 3), or if it is already negative (time $=T_1$ to $T_2$), the input to power amplifier 12 will go positive, biasing the amplifier to conduct sufficiently to energize relay RL1 through closed contacts $f1$ and $f2$ of relay RL2. The contacts of relay RL1 all close, and a holding circuit is established through contacts $a$ and $a1$. The in-phase power amplifier 10 is now connected to the coil of RL12 through normally closed contacts $i$ and $i2$ of RL3 and contacts $b$ and $b1$ of RL1. However, nothing will occur with respect to relay RL2 until the reference signal reverses polarity again (time $=T_2$ in FIG. 3). When the latter occurs so that the input to amplifier 10 is positive, relay RL2 will close.

When relay RL2 closes at time T2, it connects the negative power supply to clutch CL5 through contacts L and L1, $e$ and $e1$, and $t$ and $t2$. This causes clutch CL5 to be engaged, starting movement of slider 52 under the influence of motor M1.

The bottom ends of the coils of relays RL5 and RL6 are unconnected until relay RL2 closes. Then they are connected to the negative voltage supply through contacts $e$ and $e1$ of relay RL2 and normally closed contacts L and L1 of relay RL4. At this point, the signal channel is set up for measurement.

Relay RL5 will close only on a negative test signal provided its return side (i.e., negative side) is connected to the negative voltage supply as a consequence of a previous closing of relay RL2. When the test signal next goes negative (time$=T_3$ in FIG. 3), or if it is already negative, the input to amplifier 12a will go positive, causing it to conduct sufficiently to close relay RL5. A holding circuit for relay RL5 is established through contacts $o$ and $o1$. The now closed contacts $p$ and $p1$ of relay RL5 now connect the upper or positive end of the coil of relay RL6 to the in-phase power amplifier 10a. Thereafter, relay RL6 will close when the test signal next goes positive (time$=T_5$ in FIG. 3). At this point, clutch CL5 will disengage due to opening of contacts $t$ and $t2$ and clutch CL6 will be engaged due to closing of contacts $t$ and $t1$. Disengagement of clutch CL5 stops slider 52 and engagement of clutch CL6 starts slider 50.

When relay RL2 was closed, relay RL3 became connected to the negative amplifier 12 through contacts $f$ and $f1$ of RL2. Thus, when the reference signal goes negative again (time$=T_4$ in FIG. 3), producing a positive signal at the input to amplifier 12, relay RL3 closes. This causes plus amplifier 10 to be connected to the coil of relay RL14 through contacts $i$ and $i1$ of relay RL3. A holding circuit for relay RL3 is established through its now closed contacts $h$ and $h1$.

Relay RL4 will close on the next positive swing of the reference signal (time$=T_6$), and its contacts $k$ and $k1$ will establish a holding circuit for its coil. Closing of relay RL4 causes disengagement of magnetic clutch CL6 since its contacts L and L1 open to break the negative or return connection between the clutch 6 and its negative voltage supply. This stops slider 50 to end the measuring operation.

Closing of relay RL4 also connects wiper 50 to the plus constant voltage source B+. Meter 62 reads zero until the standard voltage B+ is applied across the potentiometer 42; thereafter, the meter will exhibit an indication of the phase angle between the two signals until the sliders 50 and 52 are returned to their rest positions.

The relays remain as they are until the reset button is pushed to momentarily close reset switch 82. This turns on red light 79 and sets up relay RL8 so that contacts $w$ and $x$ are shifted. Contact $w2$ is opened, thereby breaking the holding circuit for starting relay RL7. This causes amber light 76 to shut off immediately and also opens contacts $v$ and $v1$ to interrupt the negative voltage return for relays RL1, RL2, RL3, and RL4. These relays immediately drop out, i.e., return to their original deenergized states.

Setting up of relay RL8 also closes contacts w and w1, thereby energizing clutches CL7 and CL8. When this occurs, motor M2 can return the wipers 50 and 52 to their original at-rest positions. Relay RL8 is kept energized for approximately 3 seconds by the time delay circuit, and this is sufficient time to allow relays RL1-RL4 to drop out and also to return the sliders to their at-rest positions. In this connection, it is to be noted that the gearing system operated by motor M2 is so designed as to turn shafts 178 and 184 at a high speed, sufficient to return the sliders to their at-rest positions in the time allowed by the time delay circuit associated with relay RL8.

Holding relay RL9 is normally off. The upper end of its coil becomes connected to a positive supply voltage through contacts x and x1 when relay RL8 is set up, and the bottom end of its coil becomes connected to a negative voltage through contacts v and v2 when starting relay RL7 is caused to drop out as a result of operation of relay RL8. When relay RL9 is set up, green light 90 goes on and contacts y and y1 close. Thereafter, when relay RL8 drops out and thereby opens contacts x and x1, relay RL9 will remain energized because of the holding circuit established through its contacts y and y1. Green light 90 provides an indication that the instrument is ready for use. It goes off when starting switch 74 is closed again. When the latter occurs, contacts v and v2 separate to interrupt the holding circuit for relay RL9.

The meter M has a single scale calibrated in degrees which covers a range of zero to sixty degrees. However, this range is extended by phase angle range switch 68 which has six settings providing ranges of 0-60, 60-120, 120-180, 180-240, 240-300, and 300-360 degrees.

With reference to FIG. 3, the phase angle is determined by the following equation: $\phi = A/B \cdot 360°$ where $A$ = interval between times $T_5$ and $T_2$ and $B$ = interval between time $T_6$ and time $T_2$.

The value of A is determined by slider 52 alone and the value of B is determined by both sliders 50 and 52, sliders 50 and 52 picking off more of resistances 44 and 48 as more and more time elapses. The total resistance between sliders 50 and 52 is proportional to the period of the reference signal and, therefore, is a measure of B. That portion of resistance 48 which is connected between slider 52 and resistance 44 is proportional to the time interval between successively occurring corresponding zero axis crossings of the reference and test signals and, therefore, is a measure of A. Consequently, the output of potentiometer 42 which is applied to the emitter follower is a measure of A/B regardless of the absolute values of A and B.

The reason for withholding application of the measuring supply voltage B+ from potentiometer 42 until disengagement of clutch CL6 is to prevent burning out the potentiometer. This is important since the potentiometer is an expensive and precise instrument.

The variable biasing circuits for clippers 6 and 6a function to shift the axis of each signal in a direction opposite to the direction of the zero axis crossing of the signal. On positive axis crossings, the axis is shifted negatively; the reverse occurs on negative axis crossings. This shifting of the axis achieves "clean" operation on low amplitude signals. If a signal is excessively noisy, it may cause the relays to chatter and may even actuate a relay prematurely. Once the system has been set off erroneously, it will not reset automatically, and time will be lost until it can be reset manually. Shifting the axis of the two signals assumes that the relays will be actuated only upon true axis crossings. Any error introduced by the shifts is essentially self-canceling since the shifts are in both directions.

Figure 2:
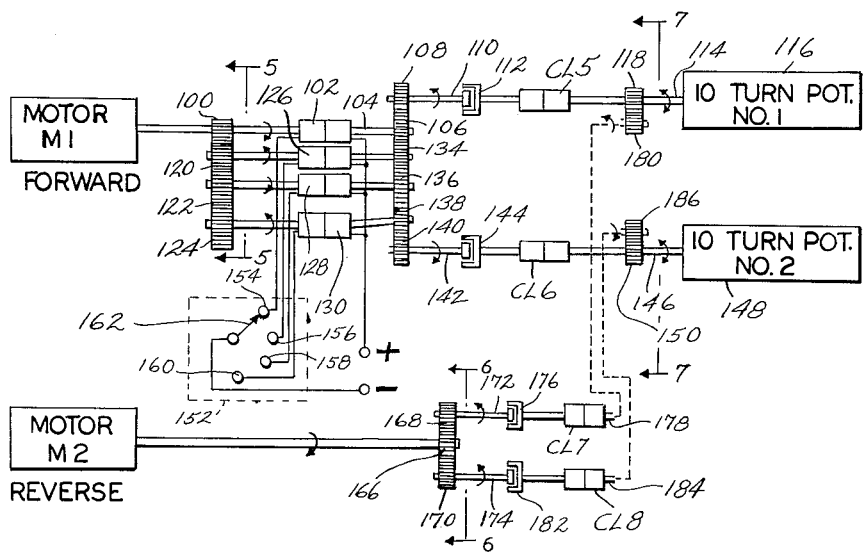
FIG. 2 is a schematic illustration of the multispeed drive system for the two potentiometer wipers.

In practice, the gear device system shown in FIG. 2 is so designed that switch 152 will provide the following four frequency ranges: .1 to 1 c.p.s.; .01 to .1 c.p.s.; .001 to .01 c.p.s.; and .0001 to .001 c.p.s.

FIG. 4 illustrates in more detail the multistage clipper, flip-flop, and power amplifier sections of one of the signal channels of FIG. 1. The positive and negative power supply connections are indicated by plus and minus signs respectively. It is believed that the construction and operation of the clipper, flip-flop, and amplifier sections are apparent from FIG. 4; and consequently, a detailed description thereof is believed unnecessary. However, it is to be noted in passing that the variable biasing network comprising resistors 14-26 is connected through slider 21 to the base of the first transistor in the multistage clipper section and that feedback of the output of the last clipper stage to the input of the first clipper stage is effected optionally via leads 200 and 202 and switch 204. Feedback is desirable primarily in the lower frequency ranges and may be omitted in the higher frequency range of .1 to 1 cycle per second. It is to be noted also that one side of the flip-flop is driven by the output of the next to the last stage of the clipper section and that the other side is driven by the output of the last stage. The outputs of the two sides of the flip-flop section are applied to the bases of the two out-of-phase power amplifiers, with the collectors of these amplifiers connected to the relay RL2 and RL3 as shown in FIG. 1.

Of course, the specific circuits of FIG. 4 are illustrative only, and other forms of clippers, flip-flops, and power amplifiers may be used in the practice of this invention.

Obviously, many modifications and variations of the present invention are possible in the light of the above teachings. It is to be understood, therefore, that the invention is not limited in its application to the details of construction and arrangement of parts specifically described or illustrated, and that within the scope of the appended claims, it may be practiced otherwise than as specifically described or illustrated.

I claim:

1. Apparatus for determining the phase angle between first and second ultra-low frequency signals, said apparatus comprising separate inputs for said signals, a potentiometer comprising a resistance element and first and second sliding contacts, said first contact connected to ground, means operable to apply a known voltage to said second contact, means for moving one of said sliding contacts along said resistance a distance proportional to the time interval between successively occurring zero axis crossings in the same direction of said two signals, means for moving the other sliding contact along said resistance a distance proportional to the time interval between the later in time of said two successively occurring zero axis crossings and the next corresponding zero axis crossing of the signal having the earlier in time crossing of said two successively occurring zero axis crossings, and means connected to said resistance for producing an output voltage proportional to the ratio of the distance covered by said one sliding contact during said first-mentioned time interval to the distance between said sliding contacts at the end of said second-mentioned time interval.

2. Apparatus as defined by claim 1 further including means driven by said output voltage for providing a visual indication of the phase angle between said first and second ultar-low frequency signals.

3. Apparatus for determining the phase angle between first and second signals each of which swings positively and negatively about a zero axis at an ultra low frequency, said apparatus comprising separate inputs for said signals, means for shifting the zero axis of each signal in a negative direction upon positive-going zero axis crossings thereof, and means for shifting the zero axis of each signal in a positive direction upon negative-going zero axis crossings thereof, a potentiometer comprising a resistance element and first and second sliding contacts, means connecting said first contact to ground, means operable to connect said second contact to a voltage source, said sliding contacts normally engaging said resistance element at its midpoint, means for moving one of said sliding contacts along said resistance toward one end thereof a distance proportional to the time interval between successively occurring zero axis crossings in the same direction of said two signals, means for moving the other sliding contact along said resistance toward the other end thereof a distance proportional to the time interval between the later in time of said two successively occurring zero axis crossings and the next corresponding zero axis crossing of the signal having the earlier in time crossing of said two successively occurring zero axis crossings, means for connecting said second contact to a voltage source after said next corresponding zero axis crossing, and means responsive to the voltage between ground and the midpoint of said resistance for indicating the phase angle between said two signals.

4. Apparatus as defined by claim 3 further including means for restoring said sliding contacts to their normal at-rest positions at the midpoint of said resistance.

5. An ultra low frequency phase meter comprising an input for a low frequency reference signal, an input for a low frequency test signal, means for squaring and clipping said reference signal, means for squaring and clipping said test signal, a potentiometer comprising a resistance element and two sliding contacts, means connecting one contact to ground, means connecting the second contact to a known voltage source, a normally off first drive means for moving said one contact along said resistance element, normally off second drive means for moving said second contact along said resistance element, means for starting said first drive means when said reference signal makes a first zero axis crossing in a given direction, means for stopping said first drive means when said test signal makes a first zero axis crossing in said given direction after said first zero axis crossing of of said reference signal, means for starting said second drive means when said test signal makes said first zero axis crossing, means for stopping said second drive means when said reference signal makes a second zero axis crossing in said given direction, and means connected to said resistance for producing an output voltage proportional to the ratio of (1) the distance covered by said one contact and (2) the distance separating said contacts after said second drive means has been stopped.

6. A phase meter as defined by claim 5 further including means responsive to said voltage for indicating the phase angle between said signals.

References Cited in the file of this patent

UNITED STATES PATENTS

| | | |
|---|---|---|
| 2,370,692 | Shepard | Mar. 6, 1945 |
| 2,444,624 | Anderson | July 6, 1948 |
| 2,855,566 | Sims et al. | Oct. 7, 1958 |
| 2,886,780 | Schauffler | May 12, 1959 |

FOREIGN PATENTS

| | | |
|---|---|---|
| 232,936 | Switzerland | Sept. 16, 1944 |